US012579913B2

(12) United States Patent
Antonakis

(10) Patent No.: US 12,579,913 B2
(45) Date of Patent: Mar. 17, 2026

(54) FLAME PRODUCING ASSEMBLIES

(71) Applicant: BIC Violex Single Member S.A., Anoixi (GR)

(72) Inventor: Ion-Ioannis Antonakis, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 211 days.

(21) Appl. No.: 18/563,500

(22) PCT Filed: May 24, 2022

(86) PCT No.: PCT/EP2022/064039

§ 371 (c)(1),
(2) Date: Nov. 22, 2023

(87) PCT Pub. No.: WO2022/248464

PCT Pub. Date: Dec. 1, 2022

(65) Prior Publication Data

US 2024/0242642 A1 Jul. 18, 2024

(30) Foreign Application Priority Data

May 27, 2021 (EP) .................................... 21176282

(51) Int. Cl.
*G09G 5/00* (2006.01)
*G09F 9/30* (2006.01)
*G09F 23/00* (2006.01)

(52) U.S. Cl.
CPC .............. *G09F 9/301* (2013.01); *G09F 23/00* (2013.01); *G09F 2023/0041* (2013.01)

(58) Field of Classification Search
CPC .. G09G 5/00; G09G 2300/04; G09G 2380/00; G09F 9/301; G09F 9/37;
(Continued)

(56) References Cited

U.S. PATENT DOCUMENTS 6,422,859 B1 * 7/2002 Demetz ..................... F23Q 2/36 431/126
9,613,599 B2 4/2017 Neugebauer
(Continued)

FOREIGN PATENT DOCUMENTS

CN 2585057 11/2003
CN 203571582 U 4/2014
(Continued)

OTHER PUBLICATIONS

Appelgren, E., Möller, K. S., & Nordqvist, S. (2004). E-Paper Production Workflow: Adapting Production Workflow Processes for Digital Newsprint. Proceedings of the Technical Association of the Graphic Arts, TAGA, 2004, 181-208. Retrieved from https://urn.kb.se/resolve?urn=urn:nbn:se:kth:diva-6013.
(Continued)

*Primary Examiner* — Joe H Cheng
(74) *Attorney, Agent, or Firm* — Bookoff McAndrews, PLLC

(57) ABSTRACT

A flame producing assembly display device for displaying user-configured content is provided. The flame producing assembly display device comprises an electronic bistable display and a communication module. The electronic bistable display is configured to display an image representing the user-configured content according to image data. The communication module is in electrical communication with the electronic bistable display. The communication module is connectable to a personalization station for providing image data and power to the electronic bistable display. The electronic bistable display is suppliable with power and updating image data only when a connection between the communication module and the personalization station is established.

20 Claims, 9 Drawing Sheets

(58) Field of Classification Search
CPC .. G09F 9/372; G09F 23/00; G09F 2023/0041; A24F 40/00; A24F 40/65
See application file for complete search history.

(56) References Cited

U.S. PATENT DOCUMENTS

| | | | | |
|---|---|---|---|---|
| 10,241,377 | B1 | 3/2019 | Wang et al. | |
| 2003/0121804 | A1* | 7/2003 | Bahar | A24F 15/18 206/242 |
| 2007/0188504 | A1* | 8/2007 | Lewis | F23Q 2/32 345/501 |
| 2011/0122120 | A1 | 5/2011 | Feuilloley | |
| 2014/0107815 | A1 | 4/2014 | LaMothe | |
| 2015/0024355 | A1 | 1/2015 | Ghofrani et al. | |
| 2015/0310474 | A1 | 10/2015 | Setchell et al. | |

FOREIGN PATENT DOCUMENTS

| | | | | | |
|---|---|---|---|---|---|
| CN | 104515055 | A | | 4/2015 | |
| CN | 206284381 | U | * | 6/2017 | A24F 15/18 |
| CN | 107481083 | A | | 12/2017 | |
| CN | 107802034 | A | | 3/2018 | |
| JP | S5761355 | A | | 4/1982 | |
| JP | H11257658 | A | * | 9/1999 | |
| JP | H11325464 | A | * | 11/1999 | |
| JP | 2001304549 | A | | 10/2001 | |
| WO | 9965344 | A1 | | 12/1999 | |
| WO | 2014149631 | A2 | | 9/2014 | |
| WO | 2016009202 | A1 | | 1/2016 | |

OTHER PUBLICATIONS

International Search Report and Written Opinion, PCT/EP2022/064039, mailed Aug. 2, 2022. 14 pages.

* cited by examiner

FLAME PRODUCING ASSEMBLIES

CROSS-REFERENCE TO RELATED APPLICATIONS

This application is a National Stage application of International Application No. PCT/EP2022/064039, filed on May 24, 2022, now published as WO2022248464A1 and claims benefit from European patent application EP 21176282.8, filed on May 27, 2021 the contents being incorporated herein by reference.

TECHNICAL FIELD

The present disclosure relates to the field of flame producing assemblies, more specifically to a hand-held flame producing assembly comprising a flame producing assembly display device for displaying user-configured content on a flame producing assembly or a flame producing assembly sleeve, and to a personalization station for driving the flame producing assembly display device.

BACKGROUND

Flame producing assemblies (FPA) such as lighters are typically used for igniting purposes like igniting tobacco, cigars and/or cigarettes have been developed over the past years. Butane lighters, for instance, work by releasing liquid butane, stored in a pressurized chamber, in a narrow stream of gas. A spark, made by striking a flint with steel or by compressing piezoelectric crystal, ignites the gas which burns at about 2000° C. (3600° F.). Because butane turns liquid quickly when compressed, and just as quickly returns to gas with reduced pressure, it makes butane gas an ideal fuel for use in lighters. Releasing the pressure in the holding tank, and the liquid immediately returns to its gaseous state and shoots out the opening to meet the spark. Butane's flame is similar to that of a burning candle. Therefore, such flame producing assemblies may be referred to as candle-like flame lighters. The fuel tank of most lighters is made of plastic parts ultrasonically welded together to make a low-pressure pressure vessel. A small metal ball may seal the tank after filling. A sub-assembly (of differing designs, depending on the manufacturer) uses the size, i.e. the interior diameter of the fuel gas nozzle to release a constant level of gas, permitting a steady flame of predetermined height. The spark wheel may be made of serrated and hardened steel wire that, when rotated, creates a spark from the flint. A spring may push the flint upward to keep it in positive contact with the spark wheel. Various plastic and metal parts control the opening and closing of gas coming from the valve at the same turning with which the wheel creates a spark. The flame producing assembly provides the user with a fork-like element that opens and closes the fuel gas nozzle. The fork-like element requires positive pressure to remain open. The fork-like element can be a trigger pulled with a finger (as, for instance, in a pistol-like fire or candle lighter) or a mechanism that is pushed downward as the user spins the spark wheel.

Increasing customer demands for individualization of lighter designs have led to various personalized lighter products. Known customized lighter designs include printed designs which are printed on an outer surface the lighter during the manufacturing stage or at home. However, such designs are limited to the available graphics that have been selected by the manufacturer. Additionally, it is not cost effective for to have a large product range with thousands of different designs in order to accommodate the potential unlimited designs preferences that a consumer might desire. Other approaches include complex systems and require massive adaptation of existing flame producing assembly structures.

The object of the present disclosure is to provide a cost-efficient device to customize a flame producing assembly which provides unlimited designs.

SUMMARY

The present disclosure relates to a hand-held flame producing assembly with a flame producing assembly display device according to claim 1 and to a personalization station according to claim 9. The present disclosure further relates to a flame producing assembly display system according to claim 14 and a method for controlling a flame producing assembly display device according to claim 15. The dependent claims depict embodiments of the present disclosure.

The flame producing assembly display device for displaying user-configured content comprises an electronic bistable display and a communication module. The electronic bistable display is configured to display an image representing the user-configured content according to image data. The electronic bistable display may be a liquid crystal display (LCD) display, also called e-paper display and allows the LCD glass to show an image without the need of any power. The communication module is in electrical communication with the electronic bistable display. The communication module is connectable to a personalization station for providing image data and power to the electronic bistable display. The electronic bistable display is suppliable with power and updating image data only when a connection between the communication module and the personalization station is established. Thereby, the image displayed on the electronic bistable display can be changed. In that the flame producing assembly display device is suppliable with power and image to change the image shown on the electronic bistable display when a connection is established, the size and complexity of the flame producing assembly display device can be reduced because the supporting structure, for instance power supply, drive system and computing system can be provided externally. Thereby, also the cost of the flame producing assembly display device can be reduced. When used in combination with a flame producing assembly or flame producing assembly sleeve, the appearance of the flame producing assembly body or housing can be individually customized. For instance, a user can determine the content he or she wishes to be displayed on the electronic bistable display. By having an electronic bistable display, it is only necessary to provide the flame producing assembly display device with power and image data when a change of image is desired. Due to the bistability properties of the display, once an image is created or displayed no further power or signals, e.g. image data, are required. When a different flame producing assembly design is desired, corresponding image data and required power can be provided to the flame producing assembly display device by establishing a connection to the personalization station in order to update the image shown on the electronic bistable display. In aspects, the flame producing assembly may be configured as a lighter, i.e. the flame producing assembly display device may be a lighter display device.

In particular aspects, the electronic bistable display may be an electrophoretic bistable display.

In aspects, the electronic bistable display may have a thickness between 0.2 mm to 2.0 mm, specifically between 0.5 mm to 1.5 mm, and particularly between 0.6 mm to 1.2 mm. In some aspects, an additional protective layer may be applied on an outer surface of the electronic bistable display.

In aspects, the electronic bistable display may be an electronic-ink display. In aspects, the electronic bistable display may be a zenithal bistable display. In aspects, the electronic bistable display may be a bistable liquid crystal display. In aspects, the electronic bistable display may be an electrochromic display.

In aspects, the communication module may comprise a wireless communication interface for establishing a connection to the personalization station. In aspects, the communication module may be configured to receive image data from the personalization station via one or more of near field communication (NFC), Bluetooth and/or Wireless Fidelity (Wi-Fi). In aspects, the communication module may be configured to receive power from the personalization station via inductive coupling. In aspects, the communication module may be configured to receive power from the personalization station via NFC and/or via Qi wireless charging. In aspects, the power received may be in the range of 50 mW to 150 mW, specifically 75 mW to 125 mW and particularly about 80 mW. In examples, the wireless communication interface may comprise coils and electronics for wireless transfer of power and data.

In some aspects, wherein the communication module comprises a wireless communication interface, the communication module may comprise onboard display driver electronics. The onboard display driver electronics may be configured to convert received power and data to a form, e.g. image data or signals, that can be utilized for refreshing or updating the image displayed the electronic bistable display.

In aspects, the communication module may comprise a wired communication interface for establishing a connection to the personalization station. In aspects, the communication module may be configured to receive image data from the personalization station via physically coupling the wired communication interface to a wired flame producing assembly display communication interface of the personalization station. In aspects, the communication module may be configured to receive power from the personalization station via physically coupling the wired communication interface to the wired flame producing assembly display communication interface of the personalization station. In examples, the wired communication interface may comprise one of one or more contact pins and/or one or more conductive pads. In particular aspects, the one or more contact pins may be spring-loaded pins, for instance pogo pins. In particular aspects, the one or more conductive pads may be copper pads. A wired connection via contact pins and/or conductive pads offers a robust and durable connection at low cost.

In aspects, the user-configured content may comprise one or more of designs, logos, graphics, pictures, weather information, personal information, personal notes, birthday dates, personal calendar notes.

The present disclosure further relates to a flame producing assembly sleeve for a hand-held flame producing assembly. The flame producing assembly sleeve comprises a main body. The main body is configured to receive the hand-held flame producing assembly. The flame producing assembly sleeve further comprises the flame producing assembly display device. The electronic bistable display of the flame producing assembly display device is arranged on an outer surface of the main body. Integrating the flame producing assembly display device into a flame producing assembly sleeve enables the use of an existing flame producing assembly without the need for adapting the existing flame producing assembly and at the same time profiting from various customized design options. If the flame producing assembly is a disposable lighter, i.e. without the option for being refillable with fuel, only the lighter may be replaced when the fuel is depleted while the lighter sleeve with the lighter display device can be reused. Thereby, a more sustainable device, i.e. the lighter sleeve including the lighter display device, can be provided with the added benefit of reducing the potential e-waste, given that only the lighter will be disposed.

In aspects, the communication module may be integrated or attached to the main body of the flame producing assembly sleeve.

In aspects, the main body may comprise a front wall forming a front surface. The electronic bistable display may cover at least a portion of the front surface. In examples, the electronic bistable display may cover a majority of the front surface, for instance, at least 50%, specifically at least 70%, and particularly at least 90% of the front surface.

In aspects wherein the communication module comprises a wireless communication interface, the main body may comprise a rear wall forming a rear surface. The wireless communication interface may be arranged at or integrated to the rear wall.

In aspects wherein the communication module comprises a wired communication interface, the main body may comprise a bottom wall forming a bottom surface. The wired communication interface may be arranged at the bottom surface.

In aspects, the main body may be formed out of plastic or metal.

In aspects, the main body may be couplable with differently sized inserts to receive differently sized hand-held flame producing assemblies.

The present disclosure further relates to a hand-held flame producing assembly. The hand-held flame producing assembly comprises a housing and the flame producing assembly display device. The electronic bistable display of the flame producing assembly display device is arranged on an outer surface of the housing. In aspects, the flame producing assembly may be a lighter.

In aspects, the communication module may be integrated or attached to the housing of the hand-held flame producing assembly.

In aspects, the housing may comprise a front wall forming a front surface. The electronic bistable display may cover at least a portion of the front surface. In examples, the electronic bistable display may cover a majority of the front surface, for instance, at least 50%, specifically at least 70%, and particularly at least 90% of the front surface.

In aspects wherein the communication module comprises a wireless communication interface, the housing may comprise comprises a rear wall forming a rear surface. The wireless communication interface may be arranged at or integrated to the rear wall.

In aspects wherein the communication module comprises a wired communication interface, the housing may comprise a bottom wall forming a bottom surface. The wired communication interface may be arranged at the bottom surface.

In aspects, the housing may be formed out of plastic or metal.

The present disclosure further relates to a personalization station for driving a flame producing assembly display device to display an image representing user-configured content according to image data. The personalization station comprises a flame producing assembly display communication module, a display control and drive system and/or a power module. The flame producing assembly display communication module is connectable to the flame producing assembly display device for providing image data and/or power to an electronic bistable display of the flame producing assembly display device. The display control and drive system are in electrical communication with the flame producing assembly display communication module for controlling image data and power provided to the flame producing assembly display device. The power module is in electrical communication with the flame producing assembly display communication module for supplying the flame producing assembly display device with power. The personalization station is configured to supply the flame producing assembly display device with power and updating image data to change the image displayed on the electronic bistable display only when a connection between the flame producing assembly display communication module and the flame producing assembly display device is established. The provision of a separate personalization station to drive the flame producing assembly display device, enables the possibility of reducing the size, complexity, and cost of the flame producing assembly display device by merely integrating the electronic bistable display and a communications module into the flame producing assembly display device whereby the supporting structure, for instance the control and drive system and the power module are provided in the personalization station.

In aspects, the display control and drive system may be configured to translate input data representing user-configured content received from a programming device to image data for driving the flame producing assembly display device. In examples, the display control and drive system may comprise a computational system which is configured to translate the input signals, e.g. input data, into image signals, e.g. image data. In examples, the control and drive system may comprise a storage to store and/or buffer input data (e.g. new or updating user-configured content), previous image data and/or updating image data (e.g. new or updating user-configured content).

In aspects, the programming device may be integrally provided in the personalization station. In aspects, the programming device may be an external device. The personalization station may further comprise an external device communication module. The external device communication module may be connectable to the external device for receiving user-configured content to be displayed on the flame producing assembly display device. In examples, the external device may be a mobile device, for instance a smartphone or a tablet, a base station, for instance a computer, or another personal electronic device. In aspects, particularly wherein the programming device is integrally provided in the personalization station, the personalization station may be a mobile device, for instance a smartphone or a tablet, a base station, for instance a computer, or another personal electronic device.

In aspects, the programming device may comprise a user interface and an electronic module. The electronic module may be configured to store and run a personalization application for determining user-configured content to be displayed on the flame producing assembly display device. The personalization application may be accessible to a user via the user interface.

In aspects, the flame producing assembly display communication module may comprise a wireless flame producing assembly display communication interface for establishing a connection to the flame producing assembly display device. In aspects, the flame producing assembly display communication module may be configured to send image data to the flame producing assembly display device via one or more of NFC, Bluetooth and/or Wi-Fi. In aspects, the flame producing assembly display communication module may be configured to supply power to the flame producing assembly display device via inductive coupling. In aspects, the flame producing assembly display communication may be configured to supply power to the flame producing assembly display device via NFC and/or via Qi wireless charging. In aspects, the power supplied may be in the range of 50 mW to 150 mW, specifically 75 mW to 125 mW and particularly about 80 mW. In examples, the wireless flame producing assembly display communication interface may comprise coils and electronics for wireless transfer of power and data.

In some aspects, wherein the flame producing assembly display communication module comprises a wireless flame producing assembly display communication interface, the communication module of the flame producing assembly display device may comprise onboard display driver electronics. The onboard display driver electronics may be configured to convert power and data received from the wireless flame producing assembly display communication interface to a form, e.g. image data or signals, that can be utilized for refreshing or updating the image displayed the electronic bistable display.

In aspects, the flame producing assembly display communication module may comprise a wired flame producing assembly display communication interface for establishing a connection to the flame producing assembly display device. In aspects, the flame producing assembly display communication module may be configured to send image data via physically coupling the wired flame producing assembly display communication interface to a wired communication interface of the flame producing assembly display device. In aspects, the flame producing assembly display communication module may be configured to supply power to the flame producing assembly display device via physically coupling the wired flame producing assembly display communication interface to the wired communication interface of the flame producing assembly display device. In examples, the wired flame producing assembly display communication interface may comprise one of one or more contact pins and/or one or more conductive pads. In particular aspects, the one or more contact pins may be spring-loaded pins, for instance pogo pins. In particular aspects, the one or more conductive pads may be copper pads. A wired connection via contact pins and/or conductive pads offers a robust and durable connection at low cost.

In aspects, the power module may comprise an energy storage and a charging system. In examples, the energy storage may be a battery. In aspects, the charging system may be connectable to an external energy source, e.g. a power line. By the provision of the energy storage a portable personalization station can be provided. Furthermore, the power supply to the flame producing assembly display device can be secured when needed. In aspects, the charging system may be configured to charge and maintain the health of the energy storage.

In aspects, the display control and drive system may comprise display driver electronics. The display driver electronics may be configured to provide the required power and image data representing user-configured content to the flame producing assembly display device, particularly via the flame producing assembly display communication module.

In aspects, wherein the flame producing assembly display communication module comprises a wireless flame producing assembly display communication interface, the communication module of the flame producing assembly display device may comprise onboard display driver electronics. The onboard display driver electronics may be configured to convert power and data, e.g. wireless data, received from the wireless flame producing assembly display communication interface to a form, e.g. image data or signals, that can be utilized for refreshing or updating the image displayed the electronic bistable display. In these aspects, the display driver electronics may be omitted in the display control and drive system.

The present disclosure further relates to a flame producing assembly display system. The flame producing assembly display system may be configured to display user-configured content.

In aspects, the flame producing assembly display system may comprise the flame producing assembly display device of any one of the previous aspects, and the personalization station of any one of the previous aspects. In examples, the flame producing assembly display device may be connectable to the personalization station to supply the electronic bistable display with power and image data. In aspects, the flame producing assembly display system may further comprise a programming device. The programming device may be integrally provided in the personalization station or may be a device separate to the personalization station and separate to the flame producing assembly display device. In some aspects, the personalization station may be configured to provide the electronic bistable display with image data only. In these aspects, the flame producing assembly display system may further comprise a separate power station which is configured to supply the flame producing assembly display device with power. In aspects, the power station may be connectable to the flame producing assembly display device to provide the electronic bistable display with power.

In aspects, the flame producing assembly display system may comprise the flame producing assembly sleeve of any one of the previous aspects or the flame producing assembly of any one of the previous aspects. The flame producing assembly display system may further comprise the personalization station of any one of the previous aspects. The flame producing assembly display device may be connectable to the personalization station to supply the electronic bistable display with power and image data. In aspects, the flame producing assembly display system may further comprise a programming device. The programming device may be integrally provided in the personalization station or may be a device separate to the personalization station and separate to the flame producing assembly display device. In some aspects, the personalization station may be configured to provide the electronic bistable display with image data only. In these aspects, the flame producing assembly display system may further comprise a separate power station which is configured to supply the flame producing assembly display device with power. In aspects, the power station connectable to the flame producing assembly display device to provide the electronic bistable display with power.

In aspects, the flame producing assembly display system may comprise an electronic bistable display, a communication module, a display control and drive system, a power module, and a flame producing assembly display communication module. The electronic bistable display may be configured to display an image representing the user-configured content according to image data. The communication module may be in electrical communication with the electronic bistable display. The display control and drive system may be configured to control image data and/or power provided to the electronic bistable display. The power module may be configured to supply the flame producing assembly display device with power. The flame producing assembly display communication module may be in electrical communication with the display control and drive system and the power module. The electronic bistable display and the communication module may be provided in a flame producing assembly sleeve or in a hand-held flame producing assembly. The flame producing assembly display communication module, the display control and drive system and the power module may be provided in a personalization station. The communication module may be couplable to the flame producing assembly display communication module to establish a connection to supply the electronic bistable display with power and updating image data to change the image displayed on the electronic bistable display. In aspects, the flame producing assembly display system may further comprise a programming device. In some aspects, particularly wherein a wireless connection is established between the personalization station and the flame producing assembly display device, the communication module may comprise onboard display driver electronics. In aspects, the flame producing assembly display system may further comprise a programming device. The programming device may be integrally provided in the personalization station or may be a device separate to the personalization station and separate to the flame producing assembly display device. In some aspects, the personalization station may be configured to provide the electronic bistable display with image data only. In these aspects, the flame producing assembly display system may further comprise a separate power station which is configured to supply the flame producing assembly display device with power. In aspects, the power station connectable to the flame producing assembly display device to provide the electronic bistable display with power.

In aspects, the flame producing assembly display system may comprise an electronic bistable display, a communication module, a display control and drive system, a power module, a flame producing assembly display communication module and a power communication module. The electronic bistable display may be configured to display an image representing the user-configured content according to image data. The communication module may be in electrical communication with the electronic bistable display. The display control and drive system may be configured to control image data provided to the electronic bistable display. The power module may be configured to supply the flame producing assembly display device with power. The flame producing assembly display communication module may be in electrical communication with the display control and drive system. The power module may be in electrical communication with the power communication module. The electronic bistable display and the communication module may be provided in a flame producing assembly sleeve or in a hand-held flame producing assembly. The flame producing assembly display communication module and the display control and drive system may be provided in a personalization station. In some aspects, particularly wherein a wireless connection is established between the personalization station and the flame producing assembly display device, the communication module may comprise onboard display driver electronics. The power module and the power communication module may be provided in a power station. The communication module may be couplable to the flame producing assembly display communication module and to the power communication module to establish a connection to supply the electronic bistable display with power and updating image data to change the image displayed on the electronic bistable display. In aspects, the flame producing assembly display system may further comprise a programming device. The programming device may be integrally provided in the personalization station or may be a device separate to the personalization station, separate to the flame producing assembly display device and separate to the power station.

In aspects, the flame producing assembly display system may be configured to change the image displayed on the electronic bistable display at a refresh rate of about at least 10 Hz, about at least 30 Hz, specifically about at least 60 Hz and particularly about 85 Hz.

The present disclosure further relates to a method for controlling a flame producing assembly display device to display user-configured content. The method comprises launching via a user interface a personalization application running on a programming device. In another step, desired content to be displayed on the flame producing assembly display device is selected. In a further step, the desired content is translated into image data which can be used as drive input for the flame producing assembly display device. In another step a connection between a personalization station and the flame producing assembly display device is established. In another step, the flame producing assembly display device is supplied with power and updated with the image data according to the desired content.

In aspects, the connection is a power and data connection.

In aspects, the desired content may be automatically updated at predetermined time intervals. Corresponding image data according to the updated desired content may be generated automatically and stored on a storage of the personalization station. In aspects, the flame producing assembly display device may be automatically updated with updated image data when a connection is established.

DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

In general, the present disclosure relates to flame producing assemblies. Flame producing assemblies are commonly handheld devices, for instance small devices for providing a flame for a cigarette, a candle, or the like. With respect to the figures, the present disclosure will be exemplary explained by means of a flame producing assembly which is configured as a lighter. Therefore, instead of the expression “flame producing assembly” or expressions comprising “flame producing assembly”, the expression “lighter” or respective expressions comprising “lighter” will be used in the following. It is to be understood that the present disclosure is applicable to flame producing assemblies other than lighters.

Figure 1:
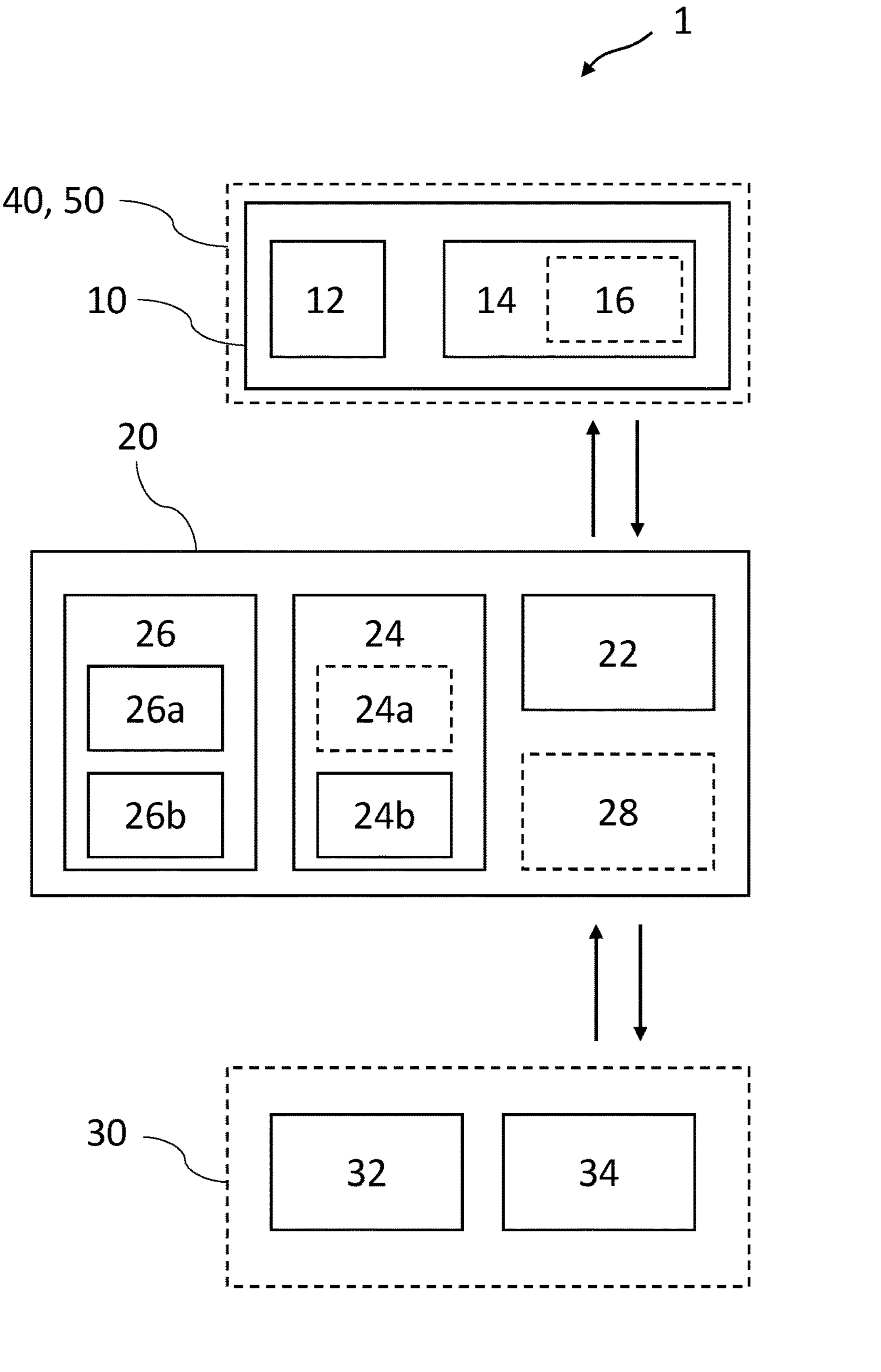
FIG. 1 shows a schematic diagram of the lighter display system and the programming device.

FIG. 1 is a schematic diagram of a lighter display system 1 according to the present disclosure. The lighter display system 1 is configured to display user-configured content. That means a user can select or determine desired content to be shown on a display 12 of the lighter display system 1. Therefore the lighter display system 1 comprises an electronic bistable display 12 which is configured to display an image representing the user-configured content. The electronic bistable display 12 is integrated in a hand-held lighter 50 (see, FIGS. 3, 6 and 8) directly or in a lighter sleeve 40 which is configured to receive a hand-held lighter (see, FIG. 2). Thereby the appearance of a lighter, specifically the appearance of a main body of the lighter sleeve 40 or a housing of the lighter 50 can be individually customized. For instance, a user can determine the content he or she wishes to be displayed on the electronic bistable display 12.

The size and complexity of the lighter sleeve 40 or the hand-held lighter 50 can remain low, because the supporting structure of the electronic bistable display 12, for instance power supply, drive system and computing system are provided externally from the lighter sleeve 40 (or the hand-held lighter 50). Besides reducing size and complexity of the lighter display device 10, also the cost of the lighter display device 10 can be reduced. The lighter display system 1 comprises a separate personalization station 20. A display control and drive system 24 and a power module 26 of the lighter display system 1 are provided in the personalization station 20. To drive the electronic bistable display 12 and thereby change the content displayed, the lighter display system 1 comprises a communication module 14 which is in electrical communication with the electronic bistable display 12, and a lighter display communication module 22 which is in electrical communication with the control and drive system 24 and the power module 26 (see, FIG. 1). Being in electrical communication can be understood as being wired or being in a wired connection. Thereby the electronic bistable display 12 and the communication module 14 form a first device which may be referred to as lighter display device 10. The lighter display communication module 22, the display control and drive system 24, and the power module 26 form a second device, the personalization station 20. Thus, alternatively described, the lighter display system 1 comprises the lighter display device 10 (or the lighter sleeve 40 or the hand-held lighter 50) and the personalization station 20, whereby the lighter display device 10 is connectable to the personalization station 20 to supply the electronic bistable display 12 with power and image data. In other words, the lighter display device 10 is couplable to the personalization station 20 via the communication modules 14, 22. In more detail, a connection can be established between the lighter display communication module 22 and the communication module 14. In general, this connection may be a data and/or power connection to supply the electronic bistable display 12 with power and/or updating image data to change the image displayed on the electronic bistable display 12. The display control and drive system 24 is configured to control image data and power provided to the electronic bistable display 12. The power module 26 is configured to supply the lighter display device 10 with power, particularly via the communication modules 14, 22. As the display control and drive system 24 and the power module 26 are provided in the personalization station an image shown on the electronic bistable display 12 can only be changed when a connection to the personalization station 20 is established. In some aspects, the lighter display system 1 further comprises a power station 60 (see, FIGS. 8 and 9). The power station 60 is configured to supply the lighter display device 10 with power. In other words, power may be supplied to the lighter display device 10 via the power station 60 alternatively or additionally to the personalization station 20. The power station 60 may comprise a power module 26 and a power communication module 62 which is couplable to the communication module 14 of the lighter display device 10. That means, the lighter display device 10 may be suppliable with power via the power station and with image data via the personalization station 20. In aspects, wherein the lighter display system 1 comprises a power station 60, the power module 26 need not be provided in the personalization station 20. In other words, the lighter display communication module 22 and the display control and drive system 24 are comprised in the personalization station 20. It is to be understood that the power station 60 is a separate device, i.e. a device separate from the lighter display device 10 and the personalization station 20.

In other words, the electronic bistable display 12 is suppliable with power and updating image data only when a connection between the communication module 14 and the personalization station 20 is established. In cases where a separate power station 60 is provided, the electronic bistable display 12 is suppliable with power and updating image data only when a connection between the communication module 14 and the personalization station 20, and between the communication module 14 and the power station 60 is established. Thereby, the image displayed on the electronic bistable display 12 can be changed. Alternatively described, the image shown on the electronic bistable display 12 is only changeable upon establishing a connection between the communication module 14 and the personalization station 20 and/or the power station 60, i.e. the lighter display communication module 22 and/or the power communication module 62, such that the electronic bistable display 12 is supplied with power and updating image data to change the image displayed on the electronic bistable display 12. By having an electronic bistable display 12, it is only necessary to provide the lighter display device 10 with power and image data when a change of the displayed image is desired. Bistability can be understood as a property of the display, or display elements (e.g. pixel), assuming one of two states, e.g. a first state and a second state. Due to bistability once a state is assumed, the state is maintained due to the latching property. In other words, the display remains stable in the assumed state (until the state is changed, i.e. the image is changed, by supplying the display with updating image data and power). An electronic bistable display 12 can be understood as a bistable display which can swap between the two states electronically, i.e. by being provided with the necessary power and/or signals. That means once a certain display state is created by supplying the display with power and image data, the display remains in this state even without further power and/or image data supply. In other words, the electronic bistable display 12 may be referred to as a passive display, achieved by bistability. In that, once an image is created or displayed, no further power or signals, e.g. image data, are required. Only when a different lighter design is desired, corresponding image data and required power may be provided to the lighter display device 10 by establishing a connection to the personalization station 20 in order to update the image shown on the electronic bistable display 12. In general terms the expression image data can be understood as signals representing the user-configured content and which can drive the electronic bistable display 12 to display this content. Image data may have been pre-provided to the electronic bistable display 12 upon manufacturing or before delivery, for instance when a user has preselected a desired design to be displayed as an image on the lighter display device 10. Updating image data may refer to image data which is provided to the electronic bistable display 12 to change the state of the electronic bistable display 12, wherein the state of the electronic bistable display 12 may be a default state or a state representing a previous image, for instance a previous image according to a previous user-configured content.

In specific examples, the electronic bistable display 12 is an electrophoretic bistable display. In some configurations, an electrophoretic display comprises micrometer sized titanium dioxide particles which are, for instance filled with charged pigments (e.g. black and white pigments positively and negatively charged, respectively). In configurations, the titanium particles may be treated alternatively to have electrically charging properties. The titanium dioxide particles may be dispersed in a hydrocarbon oil and placed between two conductive plates. One plate may be clear, while the other may be opaque. When a voltage is applied between the two, the particles move to the plate that they are attracted to. When the particles are located at the front side of the display, i.e. the clear plate, it appears white, and black when they are located at the rear side of the display, i.e. the opaque plate. In examples, the electronic bistable display 12 may be an electronic-ink display, a zenithal bistable display, a bistable liquid crystal display or an electrochromic display. In examples, the electronic bistable display 12 may be a liquid crystal display (LCD) display, also called e-paper display and allows the LCD glass to show an image without the need of any power.

The electronic bistable display 12 has a thickness between 0.2 mm to 2.0 mm. Specifically electronic bistable display 12 may have a thickness between 0.5 mm to 1.5 mm. In particular examples, the electronic bistable display 12 may have a thickness between 0.6 mm to 1.2 mm. This enables the display to be integrated in small and thin structures, such as a housing of the hand-held lighter 50 or a main body of the lighter sleeve 40. Specifically, the electronic bistable display 12 is flexible. Thereby, the electronic bistable display 12 can be adapted to the contours, e.g. rounded contours of the hand-held lighter 50 or the lighter sleeve 40. In some examples, the electronic bistable display 12 may be shatterproof. This may be achieved by, for instance, providing an additional protective layer which may be applied on an outer surface of the electronic bistable display 12. In some examples, the electronic bistable display 12 may be configured to display colored contents. In examples, the electronic bistable display 12 may be configured to display only greyscale contents.

The communication module 14 of the lighter display device 10 is connectable to the personalization station 20 for providing image data and power to the electronic bistable display 12. Alternatively described, the lighter display device 10 is couplable to the personalization station 20, particularly by establishing a connection between the communication module 14 and the lighter display communication module 22. Connectable may alternatively be described as couplable, whereby the object is to achieve a wireless or physical (or combined) data and/or power connection to drive the electronic bistable display 12.

Figure 2:
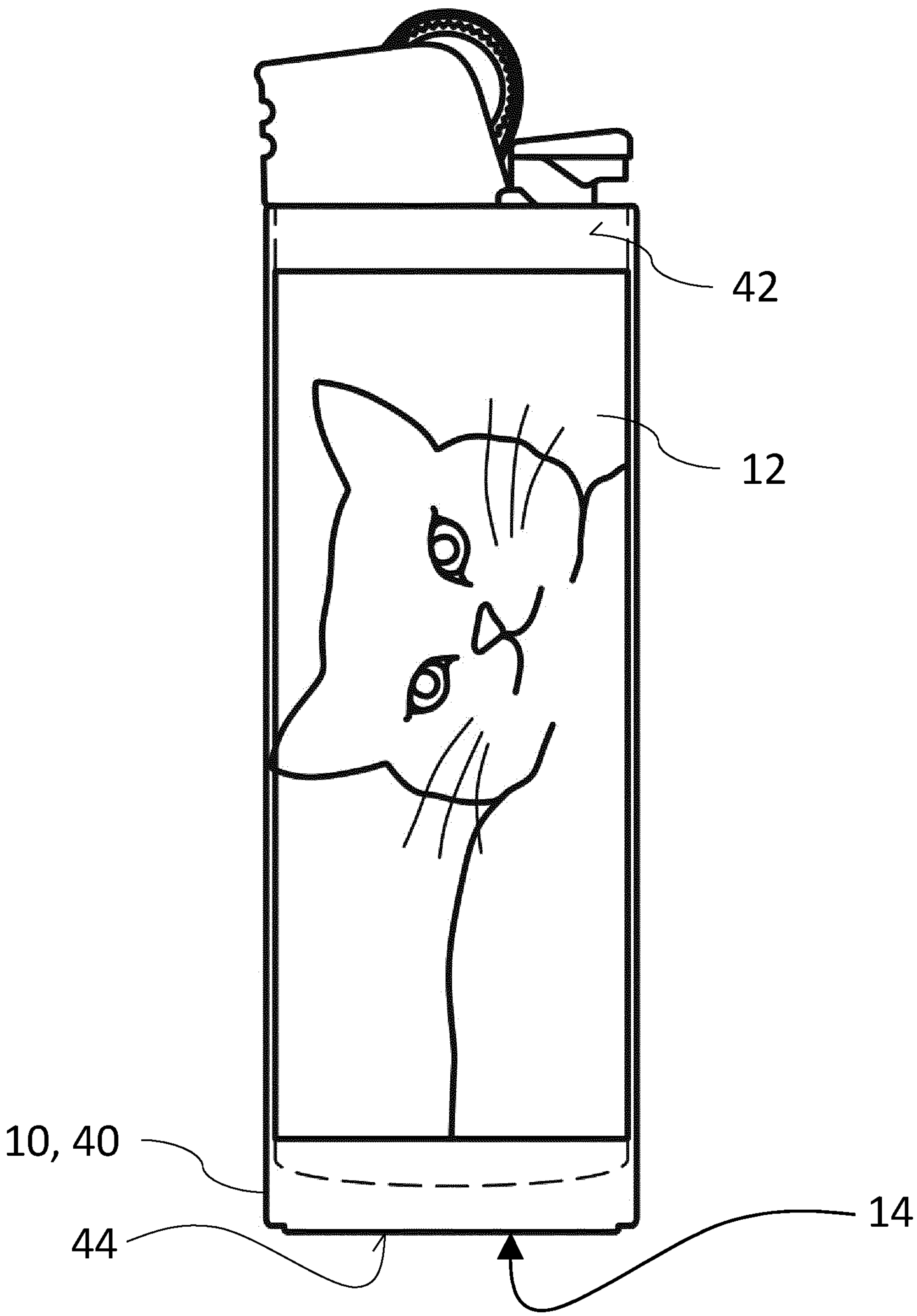
FIG. 2 shows a front view of the lighter sleeve including the lighter display device with a lighter received in the lighter sleeve.
Figure 3:
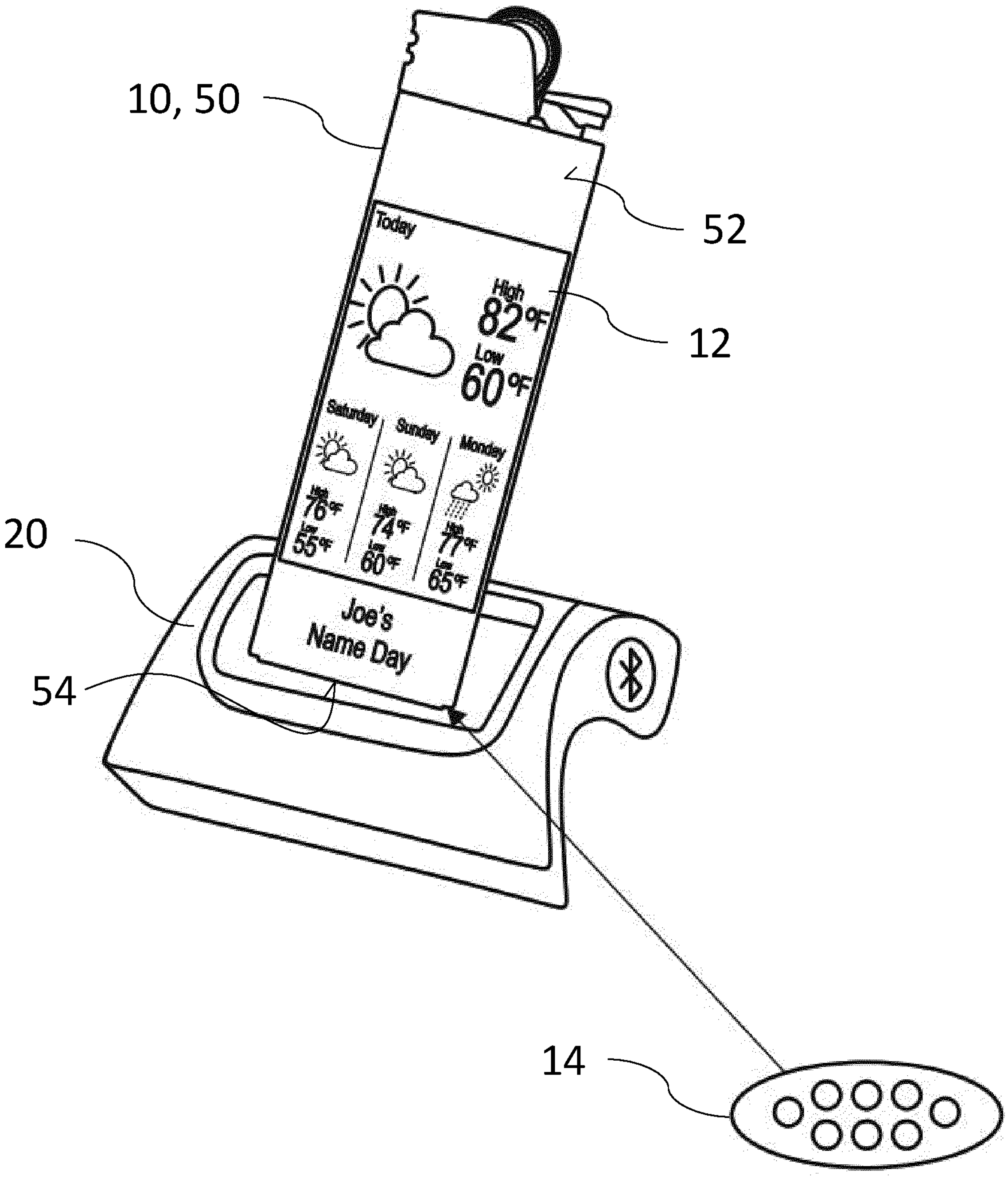
FIG. 3 shows an isometric view of the lighter display system with the lighter including the lighter display device being docketed in the personalization station.

In the example lighter display system 1 of FIG. 3, a physical connection between the lighter display device 10 and the personalization station 20 can be established. Therefore, the communication module 14 comprises a wired communication interface for establishing a connection to the personalization station 20. The lighter display communication module 22 of the personalization station 20 analogously comprises a wired lighter display communication interface for establishing a connection to the lighter display device 10. Thereby, the communication module 14 is configured to receive image data and power from the personalization station 20 via physically coupling the wired communication interface to the wired lighter display communication interface of the personalization station 20. The lighter display communication module 22 is configured to send image data and power via physically coupling the wired lighter display communication interface to the wired communication interface of the lighter display device 10. The wired communication interface of the lighter display device 10 comprises a plurality of contact pins. The contact pins are configured as spring-loaded pins, for instance pogo pins. In configurations, the contact pins may be configured differently. The wired lighter display communication interface of the personalization station 20 comprise a plurality of conductive pads. The conductive pads are configured as copper pads. In configurations, the conductive pads may be configured differently than copper pads. In the example of FIG. 3, the lighter display device 10 is integrated in a housing of a hand-held lighter 50. By placing the hand-held lighter 50, i.e. the lighter display device 10, on the personalization station 50, a physical connection can be established between the spring-loaded pins of the communication module 14 of the lighter display device 10 and the copper pads of the lighter display communication module 22 of the personalization station 20. The lighter display system 1 is configured to change the image displayed on the electronic bistable display 12 at a refresh rate of about 85 Hz. Thereby, the physical contact only needs to be maintained for a short time interval. For instance, a simple touch may be enough to establish a connection and provide updating image data and power to the lighter display device 10. In examples, the refresh rate may be higher or lower than 85 Hz. Specifically, the refresh rate may be about at least 10 Hz, about at least 30 Hz and particularly about at least 60 Hz. To facilitate the physical contact, the personalization station 20 may comprise a receiving recess (see, FIG. 3) to receive the hand-held lighter 50. The wired lighter display communication interface may be arranged in the receiving recess. Through the physical contact, image data, e.g. updating image data, and power can be provided to the lighter display device 10, particularly to its electronic bistable display 12. A physical connection via contact pins and conductive pads offers a robust and durable connection at low cost. In general, a spring-loaded pin can be understood as a type of electrical connector mechanism. Spring-loaded pins have an improved durability over other electrical contacts and an improved resilience of their electrical connection to mechanical shock and vibration. Although only explained with respect to a lighter display device 10 comprised in a hand-held lighter 50, it should be understood that the explanations above can also be applied to a lighter display device 10 being comprised in a lighter sleeve 40 as that shown in FIG. 2. Providing contact pins on the lighter display device 10 and conductive pads on the personalization station 20 should merely be understood as one example configuration. In configurations, the conductive pads and the contact pins may be provided vice versa, i.e. conductive pads on the lighter display device 10 and contact pins on the personalization station 20.

In configurations, the lighter display device 10 and the personalization station 20 may be configured such that a wireless connection can be established between them (see, for instance FIGS. 6 to 9). Therefore, the communication module 14 may comprise a wireless communication interface for establishing a connection to the personalization station 20. The lighter display communication module 22 may analogously comprise a wireless lighter display communication interface for establishing a connection to the lighter display device 10. It is to be understood that the wireless communication interfaces may comprise coils and electronics for wireless transfer of power and/or data. The personalization station 20, i.e. the lighter display communication module 22 may be configured to send data, e.g. image data or wireless data, to the lighter display device 10 via one or more of NFC, Bluetooth and/or Wi-Fi. The lighter display device 10, i.e. the communication module 14 may be correspondingly configured to receive data, e.g. image data or wireless data, from the personalization station 20 via one or more of NFC, Bluetooth and/or Wi-Fi. More specifically, in aspects wherein the communication module 14 comprises a wireless communication interface, the communication module 14 may additionally comprise onboard display driver electronics 16. The onboard display driver electronics 16 is advantageously provided in cases, where the data which is transmitted wirelessly to the lighter display device 10 is not in a form that can be directly utilized for refreshing or updating the image displayed the electronic bistable display 12. The onboard display driver electronics 16 is configured to receive power and data. The onboard display driver electronics 16 is further configured to convert received power and data to a form, e.g. image data or signals, that can be utilized for refreshing or updating the image displayed the electronic bistable display. In examples, the communication module 14 may be configured to receive power from the personalization station 20 via inductive coupling. Specifically, the communication module 14 may be configured to receive power from the personalization station 20 via NFC and/or via Qi wireless charging. In aspects, the power received may be in the range of 50 mW to 150 mW, specifically 75 mW to 125 mW and particularly about 80 mW. The lighter display communication module 22 may be configured to supply power to the lighter display device 10 via inductive coupling. Specifically, the lighter display communication 22 may be configured to supply power to the lighter display device 10 via NFC and/or via Qi wireless charging. In aspects, where NFC is used for power transmission, the power output of NFC may be increased to its maximum allowable state. In aspects, the power supplied may be in the range of 50 mW to 150 mW, specifically 75 mW to 125 mW and particularly about 80 mW.

In configurations a combined or redundant physical and/or wireless connection may be provided. For instance, a wired power connection, for instance via conductive pads and contact pins, and a wireless data connection, for instance via coils, may be established.

FIG. 2 shows a side view of the lighter sleeve 40 for a hand-held lighter according to the present disclosure. The lighter sleeve 40 comprises the lighter display device 10 and a main body which is configured to receive the hand-held lighter. In FIG. 2, the hand-held lighter is received in the lighter sleeve 40 (see FIG. 2, dashed lines and top portion of the lighter including igniter and cap). The main body of the lighter sleeve 40 is formed out of plastic. In examples, the main body of the lighter sleeve 40 may be formed out of metal. In some examples, the main body may be couplable with differently sized inserts to receive differently sized hand-held lighters. The main body comprises a front wall, a rear wall and bottom wall. The front and rear walls form opposing sides of the main body and are shaped such that the hand-held lighter can be received between them through an opening at a first end of the main body (see, top portion in FIG. 2). At a second end, opposing the first end, the bottom wall is arranged. The electronic bistable display 12 and the communication module 14 are integrated into the main body of the lighter sleeve 40. The electronic bistable display 12 is arranged on a front surface 42 formed by the front wall. Specifically, the front surface 42 is an outer surface of the lighter sleeve 40. The electronic bistable display 12 covers about 80% of the front surface 42. In examples, the electronic bistable display 12 may cover a smaller or a larger portion of the front surface 42. Specifically, the electronic bistable display 12 may cover a majority of the front surface 42. For instance, the electronic bistable display 12 may cover at least 50%, specifically at least 70%, or particularly at least 90% of the front surface 42. In examples, the electronic bistable display 12 may be arranged on another outer surface of the main body. For instance, the electronic bistable display 12 may be arranged on a rear surface formed by the rear wall. In examples, the communication module 14 and/or electronic bistable display 12 may be attached to the main body of the lighter sleeve 40. Integrating the lighter display device 10 into a lighter sleeve 40 enables the possibility of using an existing lighter without the need for adapting the existing lighter and at the same time profiting from various customized design options. If the lighter is a disposable lighter, i.e. without the option for being refillable with fuel, only the lighter may be replaced when the fuel is depleted while the lighter sleeve 40 with the lighter display device 10 can be reused. Thereby, a more sustainable device can be provided with the added benefit of reducing the potential e-waste, given that only the lighter will be disposed.

The lighter display device 10 comprised in the lighter sleeve 40 of FIG. 2 includes a communication module 14 with a wired communication interface. The wired communication interface is arranged at a bottom surface 44 formed in the bottom wall. Particularly, the contact pins of the wired communication interface may be distributed in the bottom wall. In examples, the wired communication interface may be arranged on another outer surface of the lighter sleeve 40, for instance on a bottom portion of the rear wall. In some examples, a refill opening may be arranged in the bottom wall which is arranged and dimensioned such that when a refillable hand-held lighter is received in the lighter sleeve 40, a fuel inlet valve of the hand-held lighter is accessible through the refill opening.

In examples, wherein the communication module 14 comprises a wireless communication interface, the wireless communication interface may be arranged at or integrated to the rear wall. Particularly, the wireless communication interface may be arranged at a different wall than, specifically at an opposing wall to, the wall at which the electronic bistable display 12 is arranged. Thereby, enough space for the arrangement of the coils and/or electronics for wireless transfer of power and/or data can be provided.

A lighter display device 12 being comprised in a hand-held lighter 50 is shown in FIG. 3. The hand-held lighter 50 comprises a housing, whereby the electronic bistable display 12 is arranged on an outer surface of the housing. The housing of the lighter 50 is formed out of plastic. In examples, the housing of the lighter 50 may be formed out of metal. The housing comprises a front wall, a rear wall and bottom wall. The front and rear walls form opposing sides of the housing. At a first end, or top end, of the housing, a sparkler, i.e. igniter, a fuel valve and a fuel release button are arranged (see, top portion in FIG. 2). At a second end, opposing the first end, the bottom wall is arranged. The electronic bistable display 12 and the communication module 14 are integrated into the housing of the lighter 50. The electronic bistable display 12 is arranged on a front surface 52 formed by the front wall. Specifically, the front surface 52 is an outer surface of the lighter 50. The electronic bistable display 12 covers about 80% of the front surface 52. In examples, the electronic bistable display 12 may cover a smaller or a larger portion of the front surface 52. Specifically, the electronic bistable display 12 may cover a majority of the front surface 52. For instance, the electronic bistable display 12 may cover at least 50%, specifically at least 70%, or particularly at least 90% of the front surface 52. In examples, the electronic bistable display 12 may be arranged on another outer surface of the housing. For instance, the electronic bistable display 12 may be arranged on a rear surface formed by the rear wall. In examples, the communication module 14 and/or electronic bistable display 12 may be attached to the housing of the lighter 50.

As explained above, the communication module 14 of the lighter display device 10 shown in FIG. 3 comprises a wired communication interface. The wired communication interface is arranged at a bottom surface 54 formed in the bottom wall. Particularly, the contact pins of the wired communication interface may be distributed in the bottom wall. In examples, the wired communication interface may be arranged on another outer surface of the lighter 50, for instance on a bottom portion of the rear wall.

In examples, wherein the communication module 14 comprises a wireless communication interface, the wireless communication interface may be arranged at or integrated to the rear wall. Particularly, the wireless communication interface may be arranged at a different wall than, specifically at an opposing wall to, the wall at which the electronic bistable display 12 is arranged. Thereby, enough space for the arrangement of the coils and/or electronics for wireless transfer of power and/or data can be provided.

In general terms, a hand-held lighter for being received in the lighter sleeve 40 and the hand-held lighter 50 according to the present disclosure can be understood as a flame producing device for igniting purposes like igniting tobacco, cigars and/or cigarettes, such as a butane lighter, a jet lighter, a wick lighter or an electric lighter.

With further reference to FIGS. 1 and 3, the personalization station 20 for driving the lighter display device 10 will be explained in more detail. The personalization station 20 is configured to drive the lighter display device 10 to display an image representing user-configured content according to image data. In other words, the personalization station 20 is configured to provide the lighter display device 10 with image data and power. Therefore, the personalization station 20 comprises the lighter display communication module 22, the display control and drive system 24 and the power module 26. The lighter display communication module 22 is connectable to the lighter display device 10 for providing image data and power to the electronic bistable display 12 of the lighter display device 10. The personalization station 20 is configured to supply the lighter display device 10 with power and updating image data to change the image displayed on the electronic bistable display 12 only when a connection between the lighter display communication module 22 and the lighter display device 10 is established. The provision of a separate personalization station 20 to drive the lighter display device 10, enables the possibility of reducing the size, complexity, and cost of the lighter display device 10 by merely integrating the electronic bistable display 12 and the communications module 14 into the lighter display device 10 whereby the supporting structure, for instance the control and drive system 24 and the power module 26 are provided in the personalization station 20.

The power module 26 comprises an energy storage 26*a* and a charging system 26*b* (see, FIG. 1). The energy storage 26*a* is configured as a battery. The charging system 26*b* is configured to charge and maintain the health of the energy storage 26*a*. The charging system 26*b* may be connectable to an external energy source, e.g. a power line. By the provision of the energy storage 26*a* a portable personalization station 20 can be provided. Furthermore, the power supply to the lighter display device 10 can be ensured when needed. The power module 26 may also supply the personalization station 20, e.g. one or more of the lighter display communication module 22, the display control and drive system 24, an external device communication module 28, if present, and/or a programming device 30, if present, with power. Therefore, the power module 26 may be in electrical communication with one or more of the respective modules and systems.

The display control and drive system 24 comprises display driver electronics 24*a* and a computational system 24*b* (see, FIG. 1). The display driver electronics 24*a* is configured to provide the required power and image data representing user-configured content to the lighter display device 10, particularly via the lighter display communication module 22. The computational system 24*b* is configured to translate input data representing user-configured content received from a programming device 30 to image data for driving the lighter display device 10. In some examples, the control and drive system may comprise a storage to store and/or buffer input data (e.g. new or updating user-configured content), previous image data and/or updating image data (e.g. new or updating user-configured content).

Figure 7:
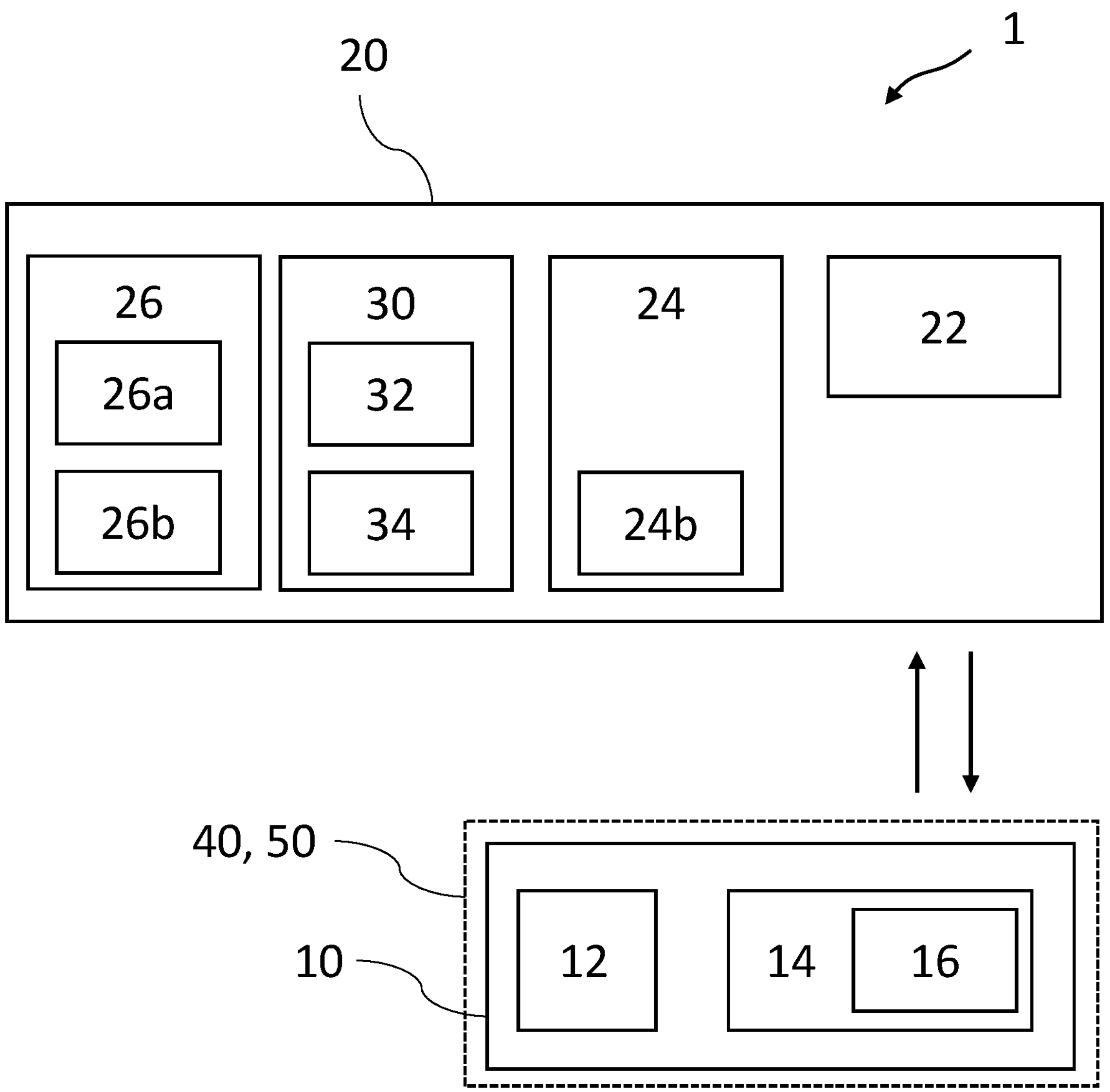
FIG. 7 shows a schematic diagram of the lighter display system according to FIG. 6.
Figure 9:
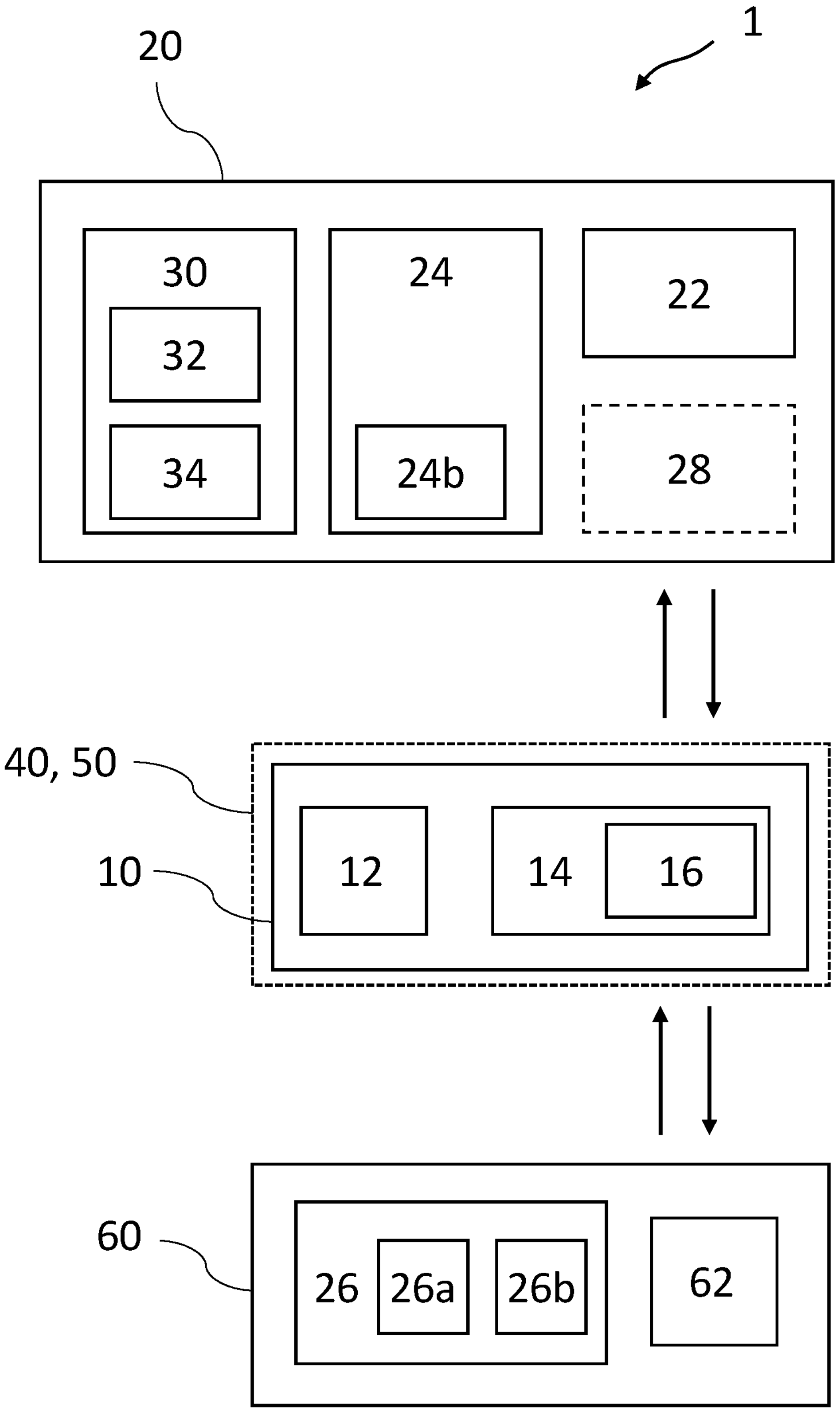
FIG. 9 shows a schematic diagram of the lighter display system according to FIG. 8.

In embodiments, wherein a wireless connection is established between the lighter display device 10 and the personalization station 20, the lighter display device 10 comprises onboard display driver electronics 16, specifically instead of the personalization station 20 comprising display driver electronics 24*a* (see, FIGS. 7 and 9). The onboard display driver electronics 16 is configured to provide the required power and image data representing user-configured content to the lighter display device 10. The computational system 24*b* is configured to translate input data representing user-configured content received from a programming device 30 to data, e.g. wireless data, which can be wirelessly sent to the lighter display device 10. The onboard display driver electronics 16 is configured to process the received data, e.g. wireless data, to provide image data to the electronic bistable display 12. This image data can be used as drive input, i.e. drive signals, for the electronic bistable display 12.

In the example configuration of FIG. 1, the programming device 30 is an external device, i.e. a device external to the personalization station 20. The personalization station 20 further comprise an external device communication module 28 which is connectable to the external device for receiving user-configured content in the form of input data. The display control and drive system 24, particularly the computational system 24*b*, translates the input data which is received from the programming device 30 into image data which can be used as drive input, i.e. drive signals, for the electronic bistable display 12. The programming device 30 comprises a user interface 32 and an electronic module 34. The electronic module 34 is configured to store and run a personalization application for determining user-configured content to be displayed on the lighter display device 10. The personalization application may be accessible to a user via the user interface. Thereby the user may determine, select and/or create desired content to be shown on the lighter display device 10, i.e. user-configured content. In some examples, the user may select content from a database. In examples, the user-configured content may be individually selected, programmed, uploaded, or synced by a user. In examples, the personalization application is a software application. In examples, the user-configured content may comprise one or more of designs, logos, graphics, pictures, weather information, personal information, personal notes, birthday dates, personal calendar notes. In some examples, the user-configured content may be daily changing or updated content. The external device may be a mobile device, for instance a smartphone or a tablet, a base station, for instance a computer, or another personal electronic device. The personalization station 20 is connectable wirelessly to the programming device 30 via the external device communication module 28. The external device communication module 28 comprises electronics and drivers for establishing the wireless connection between the personalization station 20 and the external device. In some examples, a communication protocol of the wireless connection may be of the form of Bluetooth. In examples, the communication protocol of the wireless connection may be of the form of Wireless Fidelity (Wi-Fi). The personalization station 20 may be configured to send via the external device communication module 28 the image currently displayed on the lighter display device 10 to the external device, e.g. to be shown on the user interface of the external device.

In some examples, the lighter display system 1 may comprise the programming device 30.

In examples, the programming device 30 may be comprised in the personalization station 20. More specifically, the programming device 30 may be integrally provided in the personalization station 20. In such examples, the personalization station 20 may not comprise the external communication module 28. The programming device 30 may be in electrical communication with the display control and drive system 24.

Figure 6:
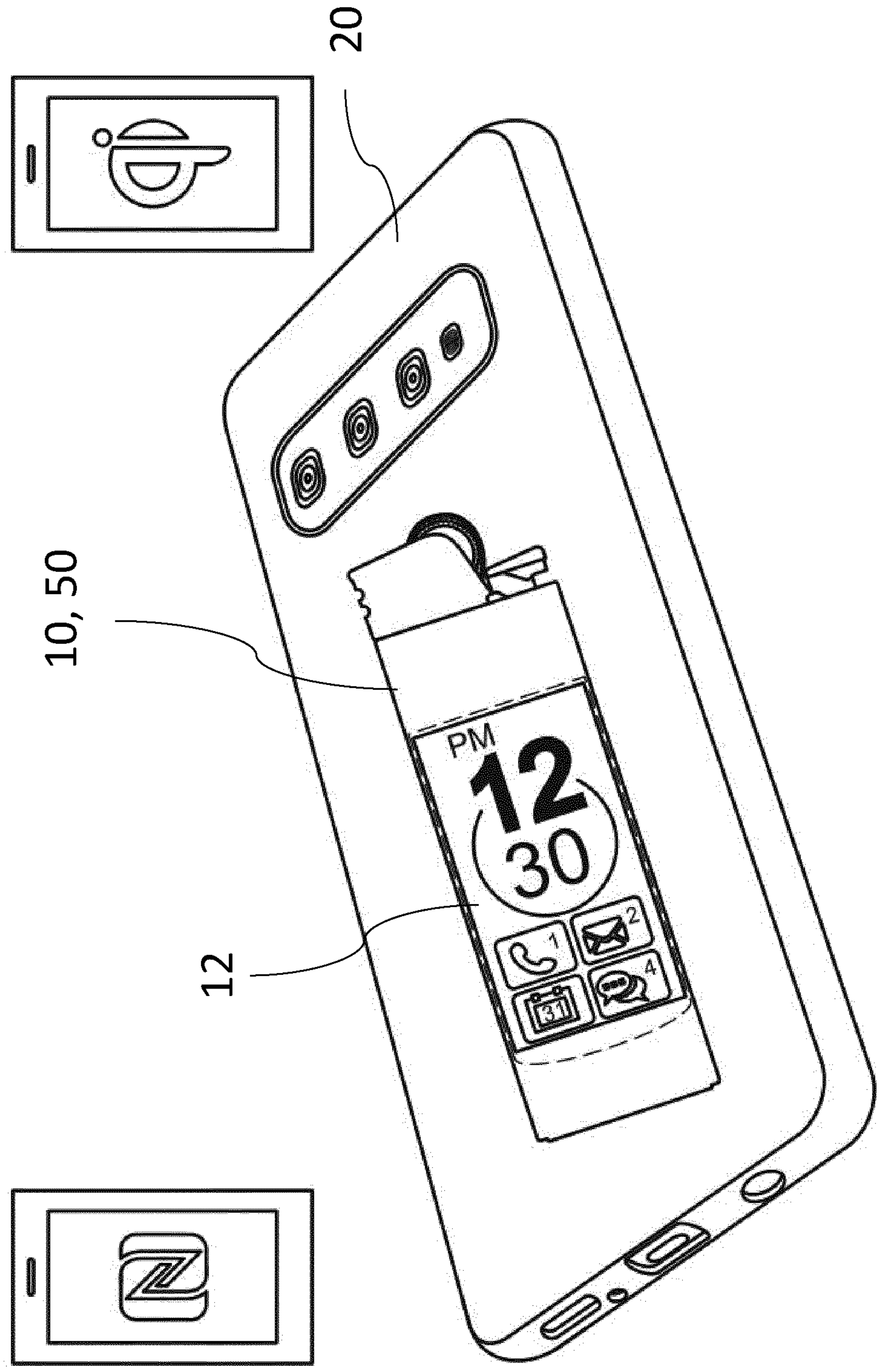
FIG. 6 shows an isometric view of the lighter display system with the lighter including the lighter display device being docketed on the personalization station which is configured as a mobile device.

In some examples, the personalization station 20 may be a mobile device, for instance a smartphone or a tablet, a base station, for instance a computer, or another personal electronic device. Particularly, in examples wherein the programming device 30 is integrally provided in the personalization station 20, the personalization station 20 may be a mobile device, for instance a smartphone or a tablet, a base station, for instance a computer, or another personal electronic device. An example configuration of a personalization station 20 being configured as a mobile device is shown in FIGS. 6 and 7. In this example, the personalization station 20 integrally comprises the programming device 30 (see, FIG. 6). The programming device 30 comprises a user interface 32 and an electronic module 34. The electronic module 34 is configured to store and run a personalization application for determining user-configured content to be displayed on the lighter display device 10. The personalization application may be accessible to a user via the user interface 32. Thereby the user may determine, select and/or create desired content to be shown on the lighter display device 10, i.e. user-configured content. In some examples, the user may select content from a database. In examples, the user-configured content may be individually selected, programmed, uploaded, or synced by a user. In examples, the personalization application is a software application. In examples, the user-configured content may comprise one or more of designs, logos, graphics, pictures, weather information, personal information, personal notes, birthday dates, personal calendar notes. In some examples, the user-configured content may be daily changing or updated content. An external device communication module 28 may be omitted as well as display driver electronics 24*a*. In the example of FIGS. 6 and 7 the personalization station 20 is configured to provide both power and data, e.g. image data or wireless data, to the lighter display device 10.

Figure 8:
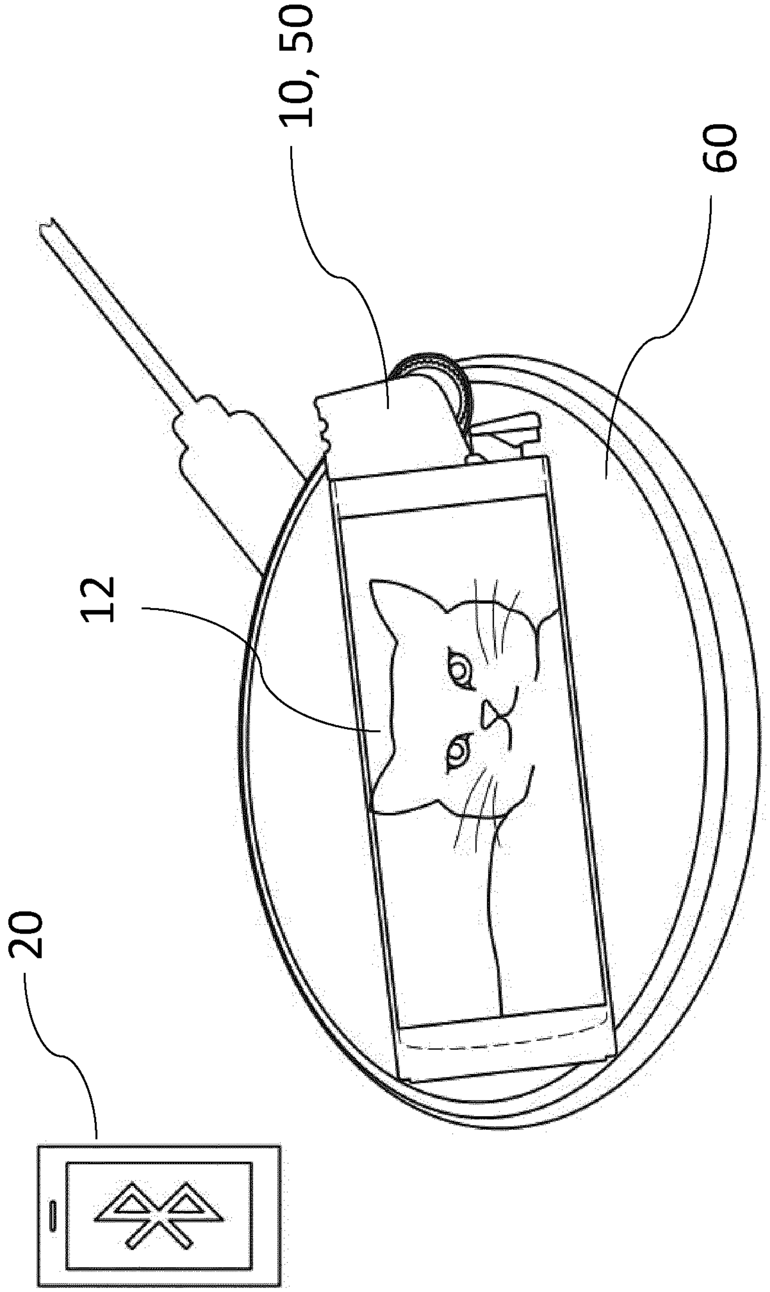
FIG. 8 shows an isometric view of the lighter display system with the lighter including the lighter display device being docketed on a power station for power supply and being in wireless data connection with the personalization station configured as a mobile device for the provision of data.

In other examples, the personalization station 20 may be configured to provide only data, e.g. image data or wireless data, to the lighter display device 10 (see, FIGS. 8 and 9). In the example of FIGS. 8 and 9, the personalization station 20 is configured to drive the lighter display device 10 to display an image representing user-configured content according to image data. The personalization station 20 comprises the programming device 30. The programming device 30 comprises a user interface 32 and an electronic module 34. The electronic module 34 is configured to store and run a personalization application for determining user-configured content to be displayed on the lighter display device 10. The personalization application may be accessible to a user via the user interface. Thereby the user may determine, select and/or create desired content to be shown on the lighter display device 10, i.e. user-configured content. In some examples, the user may select content from a database. In examples, the user-configured content may be individually selected, programmed, uploaded, or synced by a user. In examples, the personalization application is a software application. In examples, the user-configured content may comprise one or more of designs, logos, graphics, pictures, weather information, personal information, personal notes, birthday dates, personal calendar notes. In some examples, the user-configured content may be daily changing or updated content.

The personalization station 20 may be configured as a mobile device, particularly a mobile phone (see, FIG. 8). In other words, the personalization station 20 is configured to provide the lighter display device 10 with wireless data. Therefore, the personalization station 20 comprises the lighter display communication module 22 and the display control and drive system 24 (see, FIG. 9). The lighter display communication module 22 is connectable to the lighter display device 10 for providing data, e.g. image data or wireless data, to the electronic bistable display 12 of the lighter display device 10. The personalization station 20, i.e. the lighter display communication module 22 may be configured to send data to the lighter display device 10 via one or more of NFC, Bluetooth and/or Wi-Fi. The lighter display device 10, i.e. the communication module 14 may be correspondingly configured to receive data from the personalization station 20 via one or more of NFC, Bluetooth and/or Wi-Fi. The personalization station 20 is configured to supply the lighter display device 10 with updating data. The updating data, e.g. wireless data, is received by the lighter display device 10 via the communication module 14. Power is received by the by the lighter display device 10 from a separate power station 60. In aspects, the power station 60 is configured as a charging mat which is configured to receive the lighter display device 10, e.g. the lighter 50 or lighter sleeve 40 comprising the lighter display device 10. The power station 60 comprises the power module 26 and a power communication module 62. The power communication module 62 is connectable to the lighter display device 10, i.e. to the communication module 14, for providing power to the electronic bistable display 12 of the lighter display device 10. In examples, the communication module 14 may be configured to receive power from the power station 60 via inductive coupling. Specifically, the communication module 14 may be configured to receive power from the power station 60 via NFC and/or via Qi wireless charging. In aspects, the power received may be in the range of 50 mW to 150 mW, specifically 75 mW to 125 mW and particularly about 80 mW. The power communication module 62 may be configured to supply power to the lighter display device 10 via inductive coupling. Specifically, the power communication module 62 may be configured to supply power to the lighter display device 10 via NFC and/or via Qi wireless charging. In aspects, where NFC is used for power transmission, the power output of NFC may be increased to its maximum allowable state. In aspects, the power supplied may be in the range of 50 mW to 150 mW, specifically 75 mW to 125 mW and particularly about 80 mW.

More specifically, the power is received together with the wireless data by the onboard display driver electronics 16 via the communication module 14 (see, FIG. 9). The onboard display driver electronics 16 is configured to process the received data and power to provide image data to the electronic bistable display 12. This image data is used as drive input, i.e. drive signals, for the electronic bistable display 12. The provision of a separate personalization station 20 and a separate power station 60 to drive the lighter display device 10, enables the possibility of reducing the size, complexity, and cost of the lighter display device 10 by merely integrating the electronic bistable display 12 and the communication module 14 into the lighter display device 10 whereby the supporting structure, for instance the programming device 30 and the power module 26 are provided in the external devices, i.e. the personalization station 20 and the power station 60.

The power module 26 comprises an energy storage 26*a* and a charging system 26*b* (see, FIG. 9). The energy storage 26*a* is configured as a battery. The charging system 26*b* is configured to charge and maintain the health of the energy storage 26*a*. The charging system 26*b* may be connectable to an external energy source, e.g. a power line (see, FIG. 8). By the provision of the energy storage 26*a*, the power supply to the lighter display device 10 can be ensured when needed.

Alternatively, the programming device 30 may be provided as an external device separately from the personalization station 20 and the lighter display device 10 (or the lighter sleeve 40 or the hand-held lighter 50).

Figure 4:
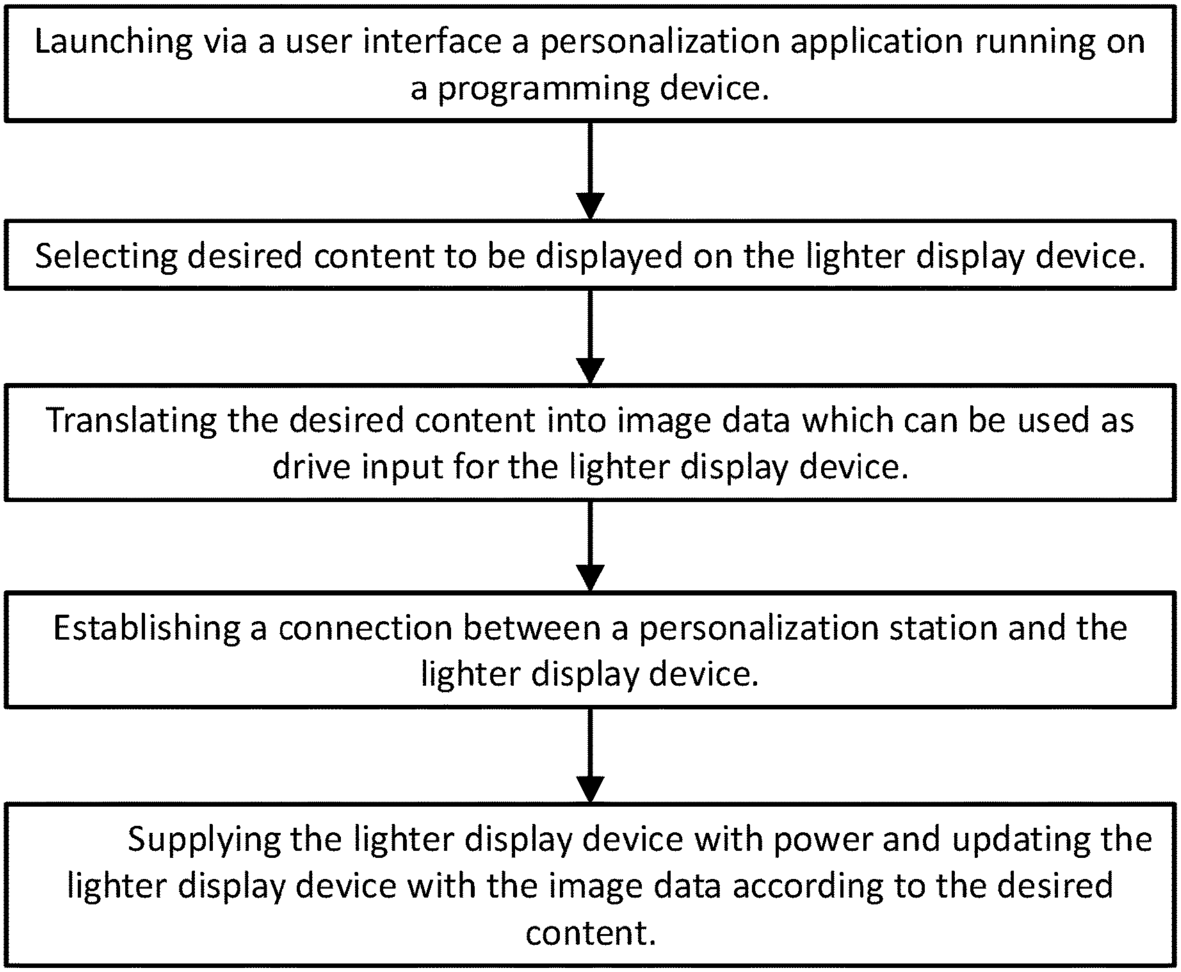
FIG. 4 shows general method steps of the method for controlling the lighter display device.

FIG. 4 shows general method steps of the method for controlling the lighter display device 10 to display user-configured content. The method comprises launching via a user interface a personalization application running on a programming device. Then, desired content to be displayed on the lighter display device is selected. Then, the selected content is sent as input data from the programming device to a personalization station. Then, the input data is translated into image data which can be used as drive input for the lighter display device. Then a connection between the personalization station and the lighter display device is established. Then, the lighter display device is supplied with power and updated with the image data according to the desired content. In examples a power and data connection is established between the personalization station and the lighter display device. In examples a wireless and/or physical connection may be established. In examples, the connection may be established by placing the lighter display device in or on the personalization station.

In some examples, the desired content may be automatically updated at predetermined time intervals, for instance daily. Corresponding image data according to the updated desired content may be generated automatically and stored on a storage of the personalization station. In aspects, the lighter display device may be automatically updated with updated image data when a connection is established. For instance, when daily weather information is the desired user-configured content, a user may simply establish a connection in the morning to update user-configured content shown on the electronic bistable display and to then carry the lighter display device with the daily actual weather during the day.

Example Method

Figure 5:
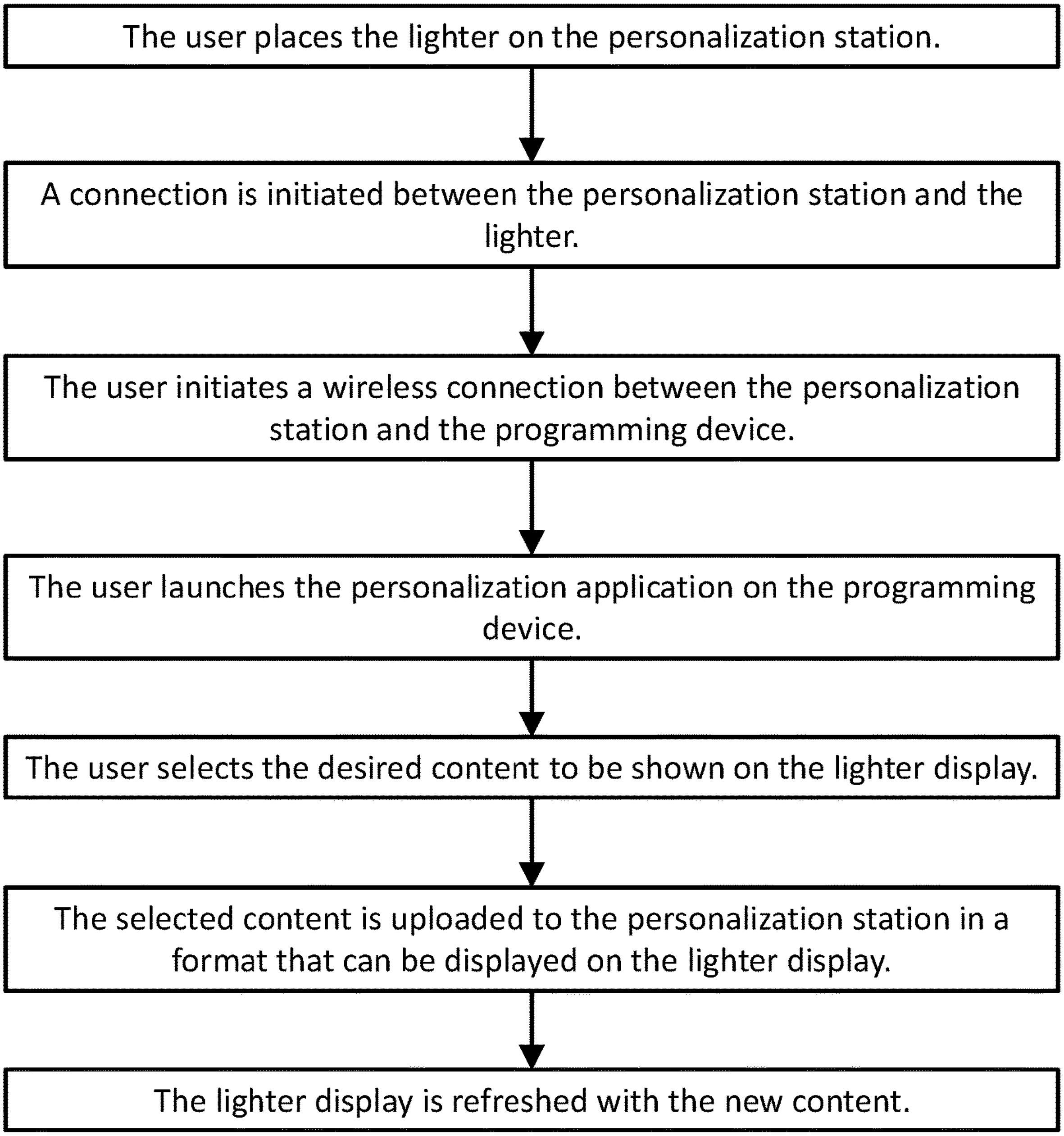
FIG. 5 shows method steps of a first example configuration of a method for controlling the lighter display device.

FIG. 5 shows method steps of a first example configuration of a method for controlling the lighter display device. In a first step, the user places the lighter on the personalization station. Then, a connection is initiated between the personalization station and the lighter. Then, the user initiates a wireless connection between the personalization station and the programming device. Then, the user launches the personalization application on the programming device. Then, the user selects the desired content to be shown on the lighter display. Then, the selected content is uploaded to the personalization station in a format that can be displayed on the lighter display. Then, the lighter display is refreshed with the new content. In examples, the lighter display is an electronic bistable display. The lighter may be a hand-held lighter comprising the lighter display device, or a lighter received in a lighter sleeve comprising the lighter display device.

In examples of the first example configuration of the method, the user places the lighter on the personalization station at the designated location. The pogo pins on the personalization station interface with the copper pads arranged on the lighter (i.e. a wired physical connection, i.e. detachable connection, is established). The personalization station detects that the connection is successful and informs the user via the lighter display. The user connects to the personalization station wirelessly with their personal mobile device. The lighter display is once again updated to reflect the successful connection between the personal mobile device and the personalization station. The user launches the personalization application on the personal mobile device. The user can now select a desired content, e.g. a picture, design and/or graphic to be shown on the lighter display from a gallery of the personal mobile device. The personalization application also offers the ability to select one or more of preset designs. Data and information can also be shown on the display (e.g. weather, calendar appointments, birthdays etc.). If the selected content is smaller than the lighter display, the user can select the desired location that it will be shown on. The selected content is uploaded to the personalization station in a format, e.g. input data that can be displayed on the lighter display. The personalization application is configured to provide the desired content selected by the user in a format can be shown on the lighter display. The personalization application converts the selected content to input data that can be sent to the personalization station. The required display signals, i.e. image data, to show the selected content are generated by the personalization station and are sent to the lighter display via the data and power interface (wired physical connection). The lighter display is refreshed with the new selected content.

REFERENCE SIGNS

| | |
|---|---|
| 1 | Flame producing assembly display system/lighter display system |
| 10 | Flame producing assembly display device/lighter display device |
| 12 | Electronic bistable display |
| 14 | Communication module |
| 16 | Onboard display driver electronics |
| 20 | Personalization station |
| 22 | Flame producing assembly display communication module/lighter display communication module |
| 24 | Display control and drive system |
| 24a | Display driver electronics |
| 24b | Computational system |
| 26 | Power module |
| 26a | Energy storage |
| 26b | Charging system |
| 28 | External device communication module |
| 30 | Programming device |
| 32 | User interface |
| 34 | Electronic module |
| 40 | Flame producing assembly sleeve/lighter sleeve |
| 42 | Front surface |
| 44 | Bottom surface |
| 50 | Flame producing assembly/lighter |
| 52 | Front surface |
| 54 | Bottom surface |
| 60 | Power station |
| 62 | Power communication module |

The invention claimed is:

1. A hand-held flame producing assembly comprising:

a housing, a flame producing assembly display device for displaying user-configured content further comprising:

an electronic bistable display configured to display an image representing the user-configured content according to image data, and a communication module in electrical communication with the electronic bistable display, the communication module having one of one or more contact pins and/or one or more conductive pads, wherein the communication module is connectable to a personalization station for providing image data and power to the electronic bistable display, wherein the electronic bistable display is configured to receive power and image data when a connection between the communication module and the personalization station is established.

2. The hand-held flame producing assembly of claim 1, wherein the electronic bistable display is an electrophoretic bistable display.

3. The hand-held flame producing assembly of claim 1, wherein the communication module is configured to receive image data from the personalization station via one or more of near field communication (NFC), Bluetooth or Wireless Fidelity (Wi-Fi).

4. The hand-held flame producing assembly of claim 1, wherein the communication module is configured to receive power from the personalization station via inductive coupling.

5. The hand-held flame producing assembly of claim 1, wherein the communication module is configured to receive image data from the personalization station via physically coupling a wired communication interface of the communication module to a wired flame producing assembly display communication interface of the personalization station.

6. The hand-held flame producing assembly of claim 1, further comprising a flame producing assembly sleeve, wherein the flame producing assembly sleeve comprises:

a main body configured to receive the hand-held flame producing assembly, and the flame producing assembly display device, wherein the electronic bistable display is arranged on an outer surface of the main body.

7. The hand-held flame producing assembly of claim 1, wherein the electronic bistable display is arranged on an outer surface of the housing.

8. The hand-held flame producing assembly of claim 1, wherein the electronic bistable display is one of an electronic-ink display, a zenithal bistable display, a bistable liquid crystal display, or an electrochromic display.

9. A personalization station for driving a flame producing assembly display device of the hand-held flame producing assembly of claim 1, configured to display an image representing user-configured content according to image data comprising:

a flame producing assembly display communication module connectable to the flame producing assembly display device for providing image data and power to an electronic bistable display of the flame producing assembly display device, a display control and drive system in electrical communication with the flame producing assembly display communication module for controlling image data and power provided to the flame producing assembly display device, and a power module in electrical communication with the flame producing assembly display communication module for supplying the flame producing assembly display device with power, wherein the personalization station is configured to provide the flame producing assembly display device with power and image data to change the image displayed on the electronic bistable display when a connection between the flame producing assembly display communication module and the flame producing assembly display device is established.

10. The personalization station of claim 9, wherein the display control and drive system are configured to translate input data representing user-configured content received from a programming device to image data for driving the flame producing assembly display device.

11. The personalization station of claim 9, wherein the flame producing assembly display communication module is configured to supply power to the flame producing assembly display device via physically coupling a wired flame producing assembly display communication interface to a wired communication interface of the flame producing assembly display device.

12. The personalization station of claim 9, wherein the power module comprises an energy storage and a charging system.

13. A flame producing assembly display system comprising:

the hand-held flame producing assembly of claim 1, and the personalization station of claim 9, wherein the flame producing assembly display device is connectable to the personalization station to provide the electronic bistable display with power and image data.

14. The flame producing assembly display system of claim 13, wherein the image displayed on the electronic bistable display is changed at at least one of a refresh rate of about at least 10 Hz, about at least 30 Hz, about at least 60 Hz, or about 85 Hz.

15. A flame producing assembly display system for displaying user-configured content comprising:

the hand-held flame producing assembly of claim 1, a display control and drive system for controlling image data and power provided to the electronic bistable display, a power module for supplying the flame producing assembly display device with power, and a flame producing assembly display communication module in electrical communication with the display control and drive system and the power module, wherein the flame producing assembly display communication module, the display control and drive system and the power module are provided in a personalization station, and, wherein the communication module is couplable to the flame producing assembly display communication module to establish a connection to supply the electronic bistable display with power and updating image data to change the image displayed on the electronic bistable display.

16. A method for controlling the hand-held flame producing assembly of claim 1, comprising a flame producing assembly display device to display user-configured content comprising:

launching, via a user interface, a personalization application running on a programming device, selecting desired content to be displayed on the flame producing assembly display device, translating the desired content into image data used as drive input for the flame producing assembly display device, establishing a connection between a personalization station and the flame producing assembly display device, supplying the flame producing assembly display device with power and updating the flame producing assembly display device with the image data according to the desired content.

17. The method of claim 16, wherein the desired content is automatically updated at predetermined time intervals and wherein corresponding image data according to the updated desired content is generated automatically and stored on a storage of the personalization station.

18. The method of claim 16, wherein the flame producing assembly display device is automatically updated with updated image data when a connection is established.

19. A hand-held flame producing assembly comprising:

a housing, a flame producing assembly display device for displaying user-configured content further comprising:

an electronic bistable display configured to display an image representing the user-configured content according to image data, and a communication module in electrical communication with the electronic bistable display, wherein the communication module is connectable to a personalization station for providing image data to the electronic bistable display, wherein the communication module is configured to receive power from the personalization station via inductive coupling, and wherein the electronic bistable display is configured to receive power and image data when a connection between the communication module and the personalization station is established.

20. A hand-held flame producing assembly comprising:

a housing, a flame producing assembly display device for displaying user-configured content further comprising:

an electronic bistable display configured to display an image representing the user-configured content according to image data, and a communication module in electrical communication with the electronic bistable display, wherein the communication module is connectable to a personalization station for providing power to the electronic bistable display, wherein the communication module is configured to receive image data from the personalization station via physically coupling a wired communication interface of the communication module to a wired flame producing assembly display communication interface of the personalization station, and wherein the electronic bistable display is configured to receive power and image data when a connection between the communication module and the personalization station is established.

* * * * *